United States Patent [19]
Foster et al.

[11] Patent Number: 6,101,591
[45] Date of Patent: Aug. 8, 2000

[54] METHOD AND SYSTEM FOR SELECTIVELY INDEPENDENTLY OR SIMULTANEOUSLY UPDATING MULTIPLE SYSTEM TIME CLOCKS IN AN MPEG SYSTEM

[75] Inventors: Eric M. Foster, Owego, N.Y.; William R. Lee, Apex, N.C.; Ronald S. Svec, Berkshire, N.Y.

[73] Assignee: International Business Machines Corporation, Armonk, N.Y.

[21] Appl. No.: 09/047,983

[22] Filed: Mar. 25, 1998

[51] Int. Cl.[7] ........................................... G06F 12/02
[52] U.S. Cl. ................... 711/219; 711/103; 711/156; 711/166; 711/168; 713/501; 345/515; 348/423; 348/512; 348/515; 352/12; 352/20
[58] Field of Search ................... 711/219, 103, 711/156, 166, 168; 713/501; 345/515; 348/423, 512, 515; 352/12, 20

[56] References Cited

U.S. PATENT DOCUMENTS

| | | | |
|---|---|---|---|
| 5,537,148 | 7/1996 | Fujinami | 348/473 |
| 5,598,352 | 1/1997 | Rosenau et al. | 395/806 |
| 5,604,544 | 2/1997 | Bertram | 348/601 |
| 5,617,502 | 4/1997 | Ort et al. | 386/97 |
| 5,668,599 | 9/1997 | Cheney et al. | 348/402 |
| 5,699,392 | 12/1997 | Dokic | 375/376 |
| 5,808,722 | 9/1998 | Suzuki | 352/12 |

FOREIGN PATENT DOCUMENTS 9-93577 of 1997 Japan .

OTHER PUBLICATIONS

"Reconstructive Inverse Quantization of Motion Picture Expert Group Data", IBM Technical Disclosure Bulletin, vol. 39, No. 03, Mar., 1996, pp. 33–37.

*Primary Examiner*—Hiep T. Nguyen
*Attorney, Agent, or Firm*—William H. Steinberg, Esq.; Heslin & Rothenberg, P.C.

[57] ABSTRACT

Method, system and computer program product are provided for selectively separately updating multiple system time clocks or synchronously updating the multiple system time clocks (STCs). Separate or simultaneous updating of the system time clocks is attained by selectively adjusting the addresses to the system time clocks in updatable address register fields. A first address value is provided to a first address register associated with a first STC register and a second address value is provided to a second address register associated with a second STC register. Independent updating of the first STC register and the second STC register is performed when the first address value and the second address value are different, while synchronous updating is performed when the first address value and the second address value comprise a common address value. The technique can be extrapolated to any number of clocks to be updated.

27 Claims, 5 Drawing Sheets fig. 1 fig. 2 fig. 4 fig. 5A  fig. 5B

METHOD AND SYSTEM FOR SELECTIVELY INDEPENDENTLY OR SIMULTANEOUSLY UPDATING MULTIPLE SYSTEM TIME CLOCKS IN AN MPEG SYSTEM

TECHNICAL FIELD

This invention relates in general to synchronizing audio and video digital data during decompression and playback and, more particularly, to a technique for selectively synchronizing independent system time clocks of the video and audio decode units of an MPEG decode system.

BACKGROUND OF THE INVENTION

A common standard continues to evolve for the multiplexing of bitstreams from several audio, video, and/or auxiliary data sources. This standard, developed by the ISO Moving Picture Experts Group (MPEG), is set forth in draft form in a document entitled "Coding of Moving Pictures and Associated Audio" (ISO/IEC 13818 published by the ISO/IEC Copyright Office, Geneva, Switzerland), and hereby incorporated herein by reference. The MPEG standards provide for the transmission of digital information from multiple signal sources by dividing the digital data into a number of packets. The packets are then multiplexed onto a single data channel, allowing a relatively large number of users to transmit data over a common data channel.

A common transport stream syntax is required by the MPEG-2 audio-video coding standard. All audio, video and auxiliary information to be carried within a given data channel is divided into 188 byte long transport packets. Each transport packet is subdivided into a header and a payload. The header carries information to identify the type of data that is carried within the payload and information required to decode the transport packet stream. Of some significance to this invention is the presence of a program clock reference (PCR) value. The PCR is a 42-bit value that represents time references from a relative system time clock (STC) within an MPEG-2 encoder. Of the 42 bits, the upper 33 bits are referred to as the "PCR base", and express a value of the encoder system time clock in 90 kHz time base units. The remaining 9 bits of the PCR value are referred to as the "PCR extension", and express a value of the system time clock in 27 MHz time base units. The MPEG-2 standard requires that the PCR be provided at intervals of no more than 100 ms in the transport stream.

The PCR values within the MPEG-2 transport stream are used to accurately recover the encoder clock in the MPEG-2 decoder. It is necessary to maintain accurate rate matching between the encoder clock used to encode the data and the decoder clock used to decode the data in order to properly demultiplex and decode the audio and video data. The individual audio and video streams are provided with presentation time-stamps (PTSs) to indicate to the MPEG-2 decoder when to present the individual frames of video and audio data to the user. The value of each PTS is ultimately dictated by the frequency of the encoder clock, which clocks a system time clock in the MPEG-2 encoder. When encoding the data, the MPEG-2 encoder inserts the PTSs into the PES stream based on samples of the system time clock. The decoder must therefore operate at the same frequency as the encoder clock if the data is to be properly presented to a user. For purposes of this description, rate matching between the encoder clock and the decoder clock implies that the clocks are operating at the same frequency, but with a possible phase offset between them.

A difference in the encoder and decoder clock will contribute to the occurrence of a frame skip or a frame hold. For example, if an encoder clock is operating at a frequency slightly less than 27 MHz and a decoder clock is operating at a frequency slightly greater than 27 MHz, eventually the relative time represented by each clock will be separated by a time equal to the time it takes to display one frame of audio or video data. In most video decoders, a difference of one frame time is sufficient to cause a frame skip or a frame hold. Even clocks operating within a relatively close frequency of each other will eventually vary sufficiently to cause a frame skip or a frame hold, obviously a condition that is annoying to a viewer.

To synchronize the decoder clock with the encoder clock, the MPEG-2 standard suggests that the PCR values be used to implement a particular clock recovery system. Unfortunately, implementing the suggested recovery system has proven to be difficult to achieve. Various attempts have been made to avoid the expense of the suggested MPEG-2 hardware architecture. For example, MPEG-2 decoders have been developed that recover an encoder clock using only software routines. In a typical software solution, the transport stream packets are stored in a large memory buffer as they are received. PCRs within the transport packets are then recalled from memory and compared with a STC maintained by a microprocessor. This software method for recovery of the encoder clock has also proven unsuccessful, however, because the time sense that is inherently associated with the PCR is usually lost by the time the software routine processes the PCR.

Due to the difficulties in implementing the MPEG-2 suggested hardware solution for clock recovery, and the timing problems inherent in recovering a clock using a purely software solution, several MPEG-2 decoders have opted to forego clock recovery. These solutions focus on maintaining an accurate 27 MHz clock in the decoder, on the assumption that the encoder clock will also be closely kept at 27 MHz. However, as discussed above, even a small difference between the encoder clock and the decoder clock will eventually cause the decoder buffers to underflow or overflow. Solutions that have attempted to operate without synchronizing with the PCR values have thus had problems with buffer misbehavior, frame holds, frame skips, and similar anomalies.

The clock recovery system disclosed herein is directed to overcoming the above-described problems by providing separate STC registers that can be updated independently, but also to provide a convenient means for simultaneous updating multiple STC registers with a single write access when needed. Further, although the concepts presented herein are explained with reference to the audio and video decoders of an MPEG decode system, the concepts are applicable to updating any two or more counters where such independent yet synchronizable characteristics are desirable.

DISCLOSURE OF THE INVENTION

Briefly described, the invention comprises in a first aspect a method for updating multiple registers including: providing a first address value to a first address register associated with a first counter register, and providing a second address value to a second address register associated with a second counter register; and performing one of independent updating or synchronous updating of a first count value in the first counter register and a second count value in the second counter register depending upon whether said first address value and said second address value are the same or different.

In another aspect, the invention comprises a method for updating multiple registers. The method includes: periodically writing separate updates to the multiple registers using multiple write accesses; and selectively simultaneously writing a common update to each of the multiple registers to synchronize values within the multiple registers, the selectively simultaneously writing using a single write access to the multiple registers.

In still another aspect, the invention comprises a method for updating multiple registers, including a first counter register and associated first address register, and a second counter register and associated second address register. The method includes: separately writing updates to the first counter register and the second counter register so that the first counter register and the counter register are updated independently; selectively writing to at least one of the first address register and the second address register so that the first address register and the second address register contain a common address; and thereafter, simultaneously updating the first counter register and the second counter register when the first address register and the second address register contain said common address, the simultaneously updating resulting in synchronizing of values within the first counter register and the second counter register.

In a further aspect, the invention comprises a multi-register system which includes a first counter register and associated first address register having a first address value for addressing the first counter register, and a second counter register and associated second address register having a second address value for addressing the second counter register. The system further includes a controller for performing separate updating or synchronous updating of a first count value in the first counter register and a second count value in the second counter register depending upon the first address value in the first address register and the second address value in the second address register.

In a still further aspect, the invention comprises a multi-clock system which includes a first counter register and associated first address register having a first updatable address value for addressing the first counter register, and a second counter register and associated second address register having a second updatable address value for addressing the second counter register. The system further includes a controller for separately writing updates to the first counter register and the second counter register when the first updatable address value and the second updatable address value are different, and for synchronously writing updates to the first counter register and the second counter register when the first updatable address value and the second updatable address value are the same.

Articles of manufacture and computer program products comprising computer usable medium having computer readable program code means therein for updating multiple registers in accordance with the above-summarized methods and systems are also described and claimed.

Advantageously, this invention comprises in all aspects a technique for allowing a controller to selectively update multiple system time clocks (for example, located in the audio and video decoders of an MPEG decode system) in separate writes of different offset values or a common write of an identical value. When the STC value is shared, the technique guarantees that each clock contains the same value, and when STC values are separately updated different offsets can be provided. Selectivity is achieved by defining the STC addresses as updatable register fields. This principle can be extended to any group of registers that need to be independent under certain circumstances, and have a common value under other circumstances.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Although the MPEG model indicates that the STC values used by the audio and video decoder should be identical, there are situations where it is desirable to maintain separate STCs; for example, in order to compensate for offsets in latency from a STC/PTS compare to the user perceived output. Ideally, it would be advantageous to provide a clock recovery system that allows both common sharing of an STC register for the audio and video decoders, and allows independent STC registers for the audio and video decoders to allow separate offsets. When the STC is shared, it can be guaranteed that each decoder sees the same value, but the flexibility to account for offsets is removed. On the other hand, when independent STC registers are provided, there may be uncertainty as to whether the registers are at the same count since they are initially loaded through software and there can be unpredictable delays in the time between register updates. Additionally, when designing general decoders for use in a common library, one macro should not have a functional dependency on another macro, such as requiring an STC counter value to be provided by the alternate decoder.

Generally stated, this invention thus provides an integrated design for an encode/decode system where multiple clock registers can be maintained separate, but also be simultaneously updated when desired. For example, both the audio and video decode macros within an integrated decode system have a system time clock (STC) register that can be independently updated by a host processor. Pursuant to the invention, these STC registers also have associated addresses in the register field that allows the write address of each decoder's STC register to be modified. More broadly, this concept can be applied to any group of registers that need to be independent under certain circumstances, and yet synchronized under other circumstances. FIGS. 1–5b present one embodiment of the general concept as applied to an MPEG compression/decompression operation.

It should be noted that, while the STC register is referred to as a single entity, the STC value is actually 33-bits and therefore requires multiple write operations in most systems.

However, since the write operations are generally consecutive and since the counter is not updated until the last write operation, an STC write can be viewed as a singular event for simplicity.

Figure 1:
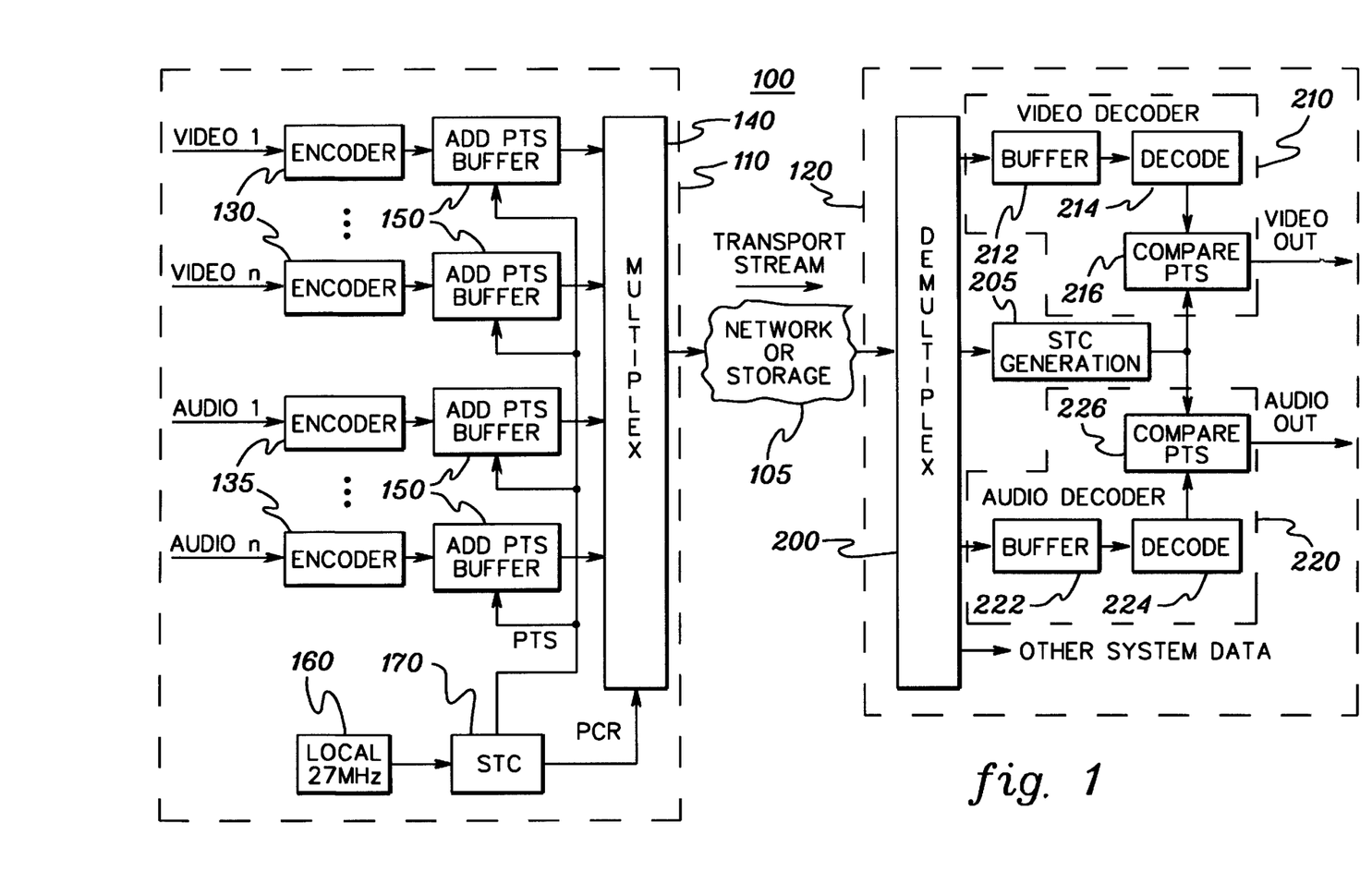
FIG. 1 is a diagram of a digital encode/decode system to employ the concepts of the present invention.

In FIG. 1, an encode/decode system 100 includes a transmitter 110 which sends a transport stream over a network or storage facility 105 to a receiver 120. Transmitter 110 includes multiple streams of digitized uncompressed video (video 1 . . . video n) and audio (audio 1 . . . audio m) which are encoded in respective MPEG video and audio encoders 130, 135. The resulting streams of compressed data are multiplexed 140 into the transport stream for transmission across the network 105. Presentation time stamps (PTSs) are added at buffers 150 to indicate when a specific video frame or audio frame is to be played once the signal is reconstructed at the receiver. The PTS values for each stream type are generated from a system time clock (STC) 170 and as a result are synchronized with respect to each other. System time clock 170 is driven by a local 27 MHz signal 160. A program clock reference (PCR) is also inserted into the transport stream at multiplexer 140 to allow the receiver's STC to mimic or recreate STC 170.

The decode system 120 receiving the transport stream includes a demultiplex function 200 which separates the video data, audio data, system clock information and other system data for processing in accordance with MPEG standard. The system clock information is sent to an STC generator 205 which provides a system time clock to a video decoder 210 and an audio decoder 220. Video decoder 210 includes a video buffer 212, a decode unit 214 and compare STC/PTS logic 216. Similarly, audio decoder 220 includes an audio buffer 222, an audio decode unit 224 and compare STC/PTS logic 226. Uncompressed video data and uncompressed audio data is output from video decoder 210 and audio decoder 220, respectively, for display to a user.

Figure 2:
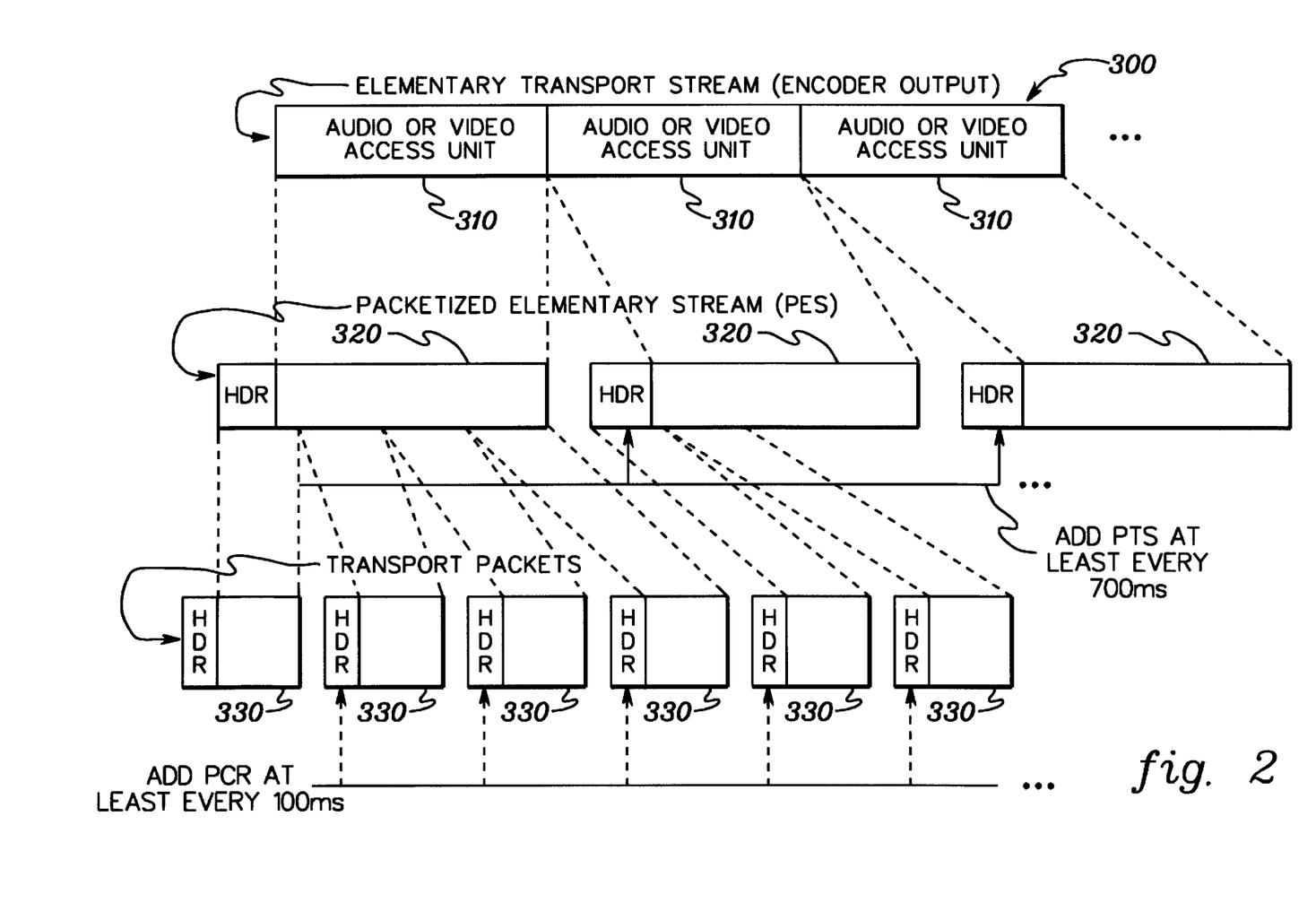
FIG. 2 is a diagram of the MPEG-2 transport stream syntax showing imbedded program clock reference (PCR) values and PTS values.

FIG. 2 depicts transport stream syntax required by the MPEG audio-video coding standard. The elementary transport stream 300 includes multiple audio or video access units 310. These access units, comprising the elementary stream, are broadcast from the transmitter to the receiver within a transport stream. Within this continuous stream of encoded video and audio data is a first layer referred to as the "packetized elementary stream" (PES) layer, which consists of multiple PES packets 320. These PES packets include header (HDR) information and payload. The header carries information to identify the type of data that is carried within the packet and information required to decode the transport packet stream. Presentation time stamps (PTS) are inserted by the transmitter at the PES header level as shown. These PTS values comprise the clock references used by the decode system to recover the STC (as described further below).

The PES packets 320 are further divided into transport packets 330, which as noted, are typically 188 byte-long packets. Each transport packet includes a header and a payload. The header carries information to identify the type of data that is carried within the payload and information required to decode the transport packet stream. An optional adaptation field is provided within the header to indicate, for example, the presence of a program clock reference (PCR) value. As discussed above, the PCR is a 42-bit value that represents time stamps from a relative system time clock (STC) within the encoder.

Although MPEG standard views the STC as a single entity, in implementation there are typically multiple STCs. For example, there are the transport STC and decoder STCs. This is because it may be desirable to offset, for example, the decode clock from the transport STC to allow for adjustments in latency and buffering. Further, this may be desirable in order to compensate for offsets in latency from the STC/PTS compare logic to the user perceived output.

Figure 3:
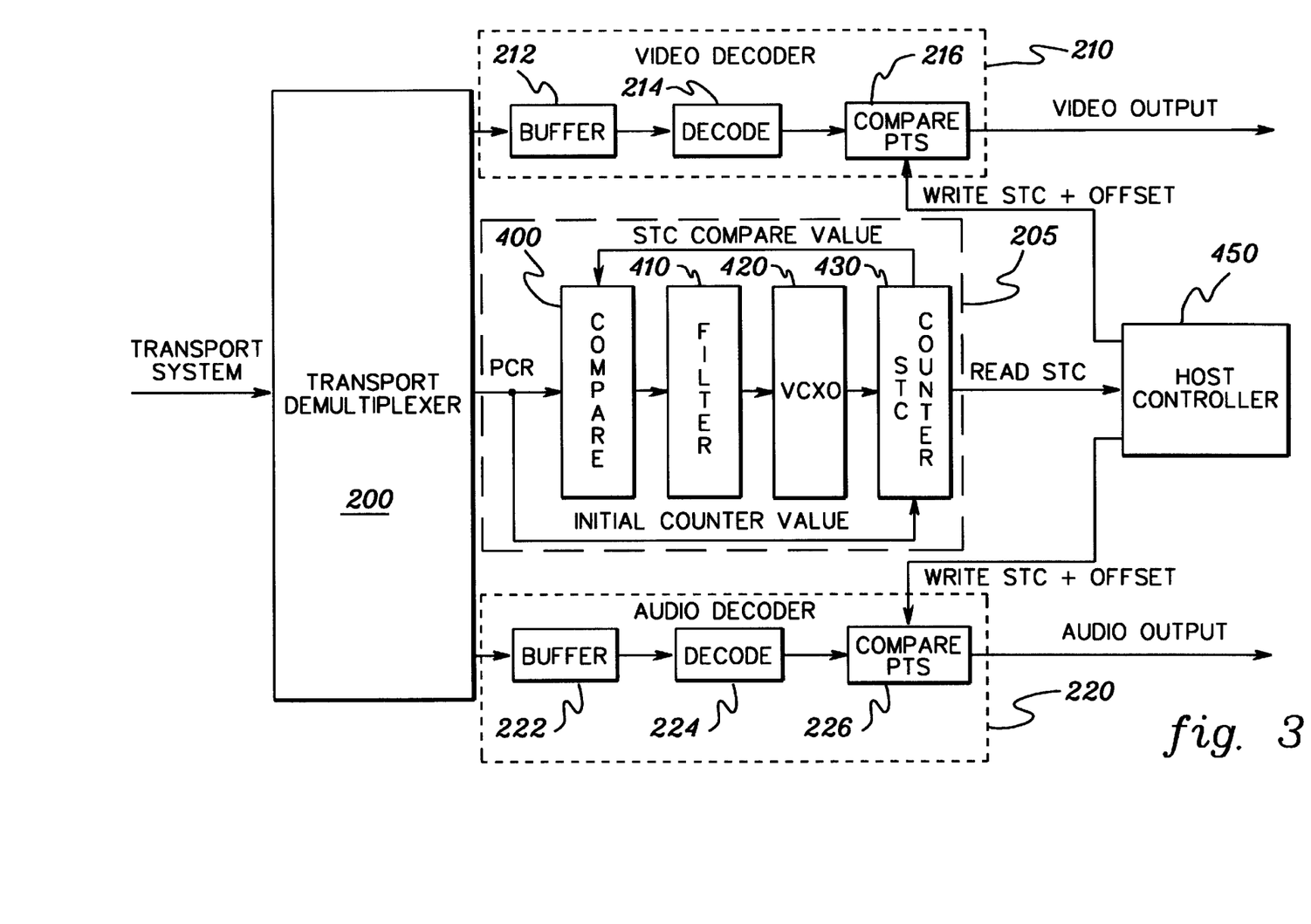
FIG. 3 is a block diagram of one embodiment of an MPEG decode system to implement clock recovery pursuant to the present invention.

FIG. 3 depicts in greater detail one embodiment of an MPEG receiver. As shown, the MPEG transport stream (comprising multiple programs) is received at transport demultiplexer 200 which, as noted, breaks the transport stream down and extracts video data, audio data and the program clock reference (PCR) values. The PCR values are used by STC generation 205 to regulate the decoder's STC counter 430. In particular, the transport stream provides an initial counter value as a seed value for the counter. Thereafter, voltage controlled crystal oscillator (VCXO) 420 generates a frequency that drives the counter 430. The value of counter 430 is returned to compare logic 400 for comparison with the PCR information received to generate a difference signal. The difference signal, fed through a filter 410 to eliminate jitter, is used to drive the VCXO 420. If STC counter 430 is running faster than the PCR, then the VCXO frequency is decreased. Conversely, if the STC counter is slower than the PCR, the VCXO frequency is increased.

Along with clock generator 205, the receiver includes video decoder 210 having (as noted) a video buffer 212, a video decode unit 214 and compare STC/PTS logic 216. Audio decoder 220 includes the above-described audio buffer 222, audio decode unit 224 and compare STC/PTS logic 226. A host controller 450 reads the STC from counter 430 and writes STC values to compare STC/PTS logic 216 and 226 as noted above. Conventionally, the writing of STC to the video decoder and the audio decoder is either fully synchronized or completely independent. If synchronized, the same STC value (and offset) is written to both the video decoder and the audio decoder, while if independent, different values are written to the two decoders. Advantageously, the present invention provides a design wherein the host controller 450 can selectively write a common STC value to both decoders or write independent STC values to the decoders. When the STC is shared, the controller guarantees that each decoder sees the same value.

Figure 4:
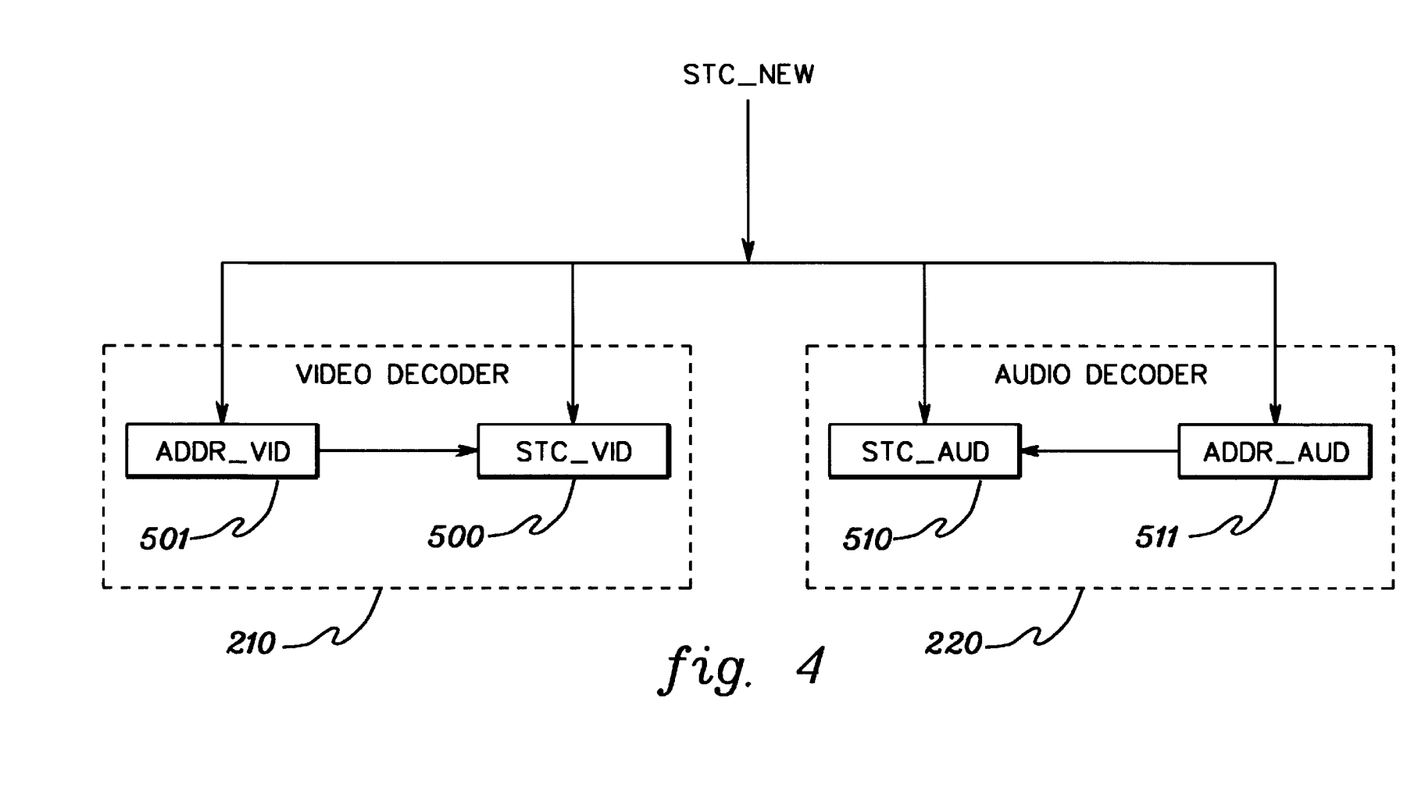
FIG. 4 is a hardware diagram of multiple STC registers and their associated, updatable address registers in accordance with the present invention for the video decoder and audio decoder of FIG. 3.

Pursuant to the present invention, two clock related registers are provided in each decoder. As shown in FIG. 4, video decoder 210 comprises an STC_VID register which holds a current STC value, received from the host controller as STC_NEW data. STC_VID register 500 is accessed with reference to an associated address value in the second register ADDR_VID 501. Address register 501 is updatable, for example, by the host controller. Thus, whether an STC_NEW clock value is to be written to STC_VID 500 is determined with reference to the address value in register 501. Similarly, audio decoder 220 includes an STC_AUD register 510 and an associated, updatable address register ADDR_AUD 511.

When the address values in registers 501 & 511 are different, the host controller can separately write updates to the STC_VID and STC_AUD registers. On the other hand, by first making the address values in registers 501 & 511 the same, the host controller can thereafter simultaneously write an STC value to both STC_VID 500 and STC_AUD 510. Further, once the counters 500 & 510 are synchronized, the host controller can return independence to the counters by writing a different address value into one of ADDR_VID 501 and ADDR_AUD 511. An indicator can be used to control whether a host write cycle is acknowledged by the given macro or not.

The update possibilities can be summarized as follows:
After initialization:
 If ADDR_VID≠ADDR_AUD
  Write STC_NEW to ADDR_VID→STC_VID=STC_NEW
   STC_AUD is unchanged
  Write STC_NEW to ADDR_AUD→STC_VID is unchanged
   STC_AUD=STC_NEW
 If set ADDR_VID=ADDR_AUD:
  Write STC_NEW to ADDR_VID (=ADDR_AUD)→
   STC_VID=STC_NEW
   STC_AUD=STC_NEW It should be noted that additional control information can be added to the audio and video address registers to provide the proper handshaking for the simultaneous update of multiple registers. As an example, an indicator can be added to control which of the decoders returns a common acknowledge to the host controller in systems that require it.

To restate, in accordance with this invention, the application processor can read the value of STC from the STC counter and write that value independently or simultaneously to the STC registers within the decoders. Thus, both independent updates and synchronization of counters are selectively possible using an updatable address field assigned to at least one of the two counters.

Figure 5A:
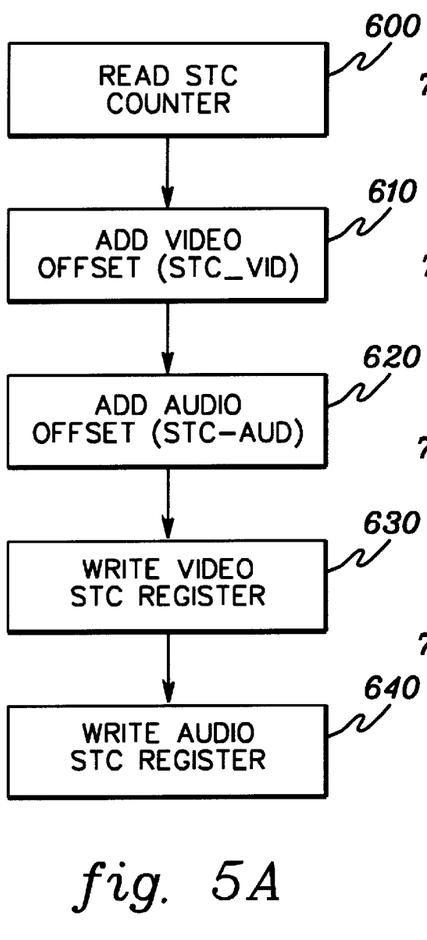
FIGS. 5a & 5b are flowcharts of exemplary processing embodiments to independently update the STC registers, and simultaneously update the STC registers, respectively, in accordance with the principles of the present invention.

FIG. 5a depicts a flowchart of independent updating of STC registers in accordance with the present invention. This processing is possible when the address stored in ADDR_VID for the video STC is different from the address stored in ADDR_AUD for the audio STC. With this assumption, the host controller reads the STC counter 600 and adds a video offset to establish an STC_NEW for the video counter 610. Similarly, an audio offset is added to the read STC counter value to establish an STC_NEW for the audio counter 620. The video STC register 500 (FIG. 4) then receives the video STC_NEW value 630, while the audio STC register 510 (FIG. 4) receives the audio STC_NEW value. Note that in accordance with this invention, one address associated with one of multiple counters can comprise a fixed address as long as the other counters each contain updatable addresses to allow establishing of identical or different addresses for the multiple counters.

Figure 5B:
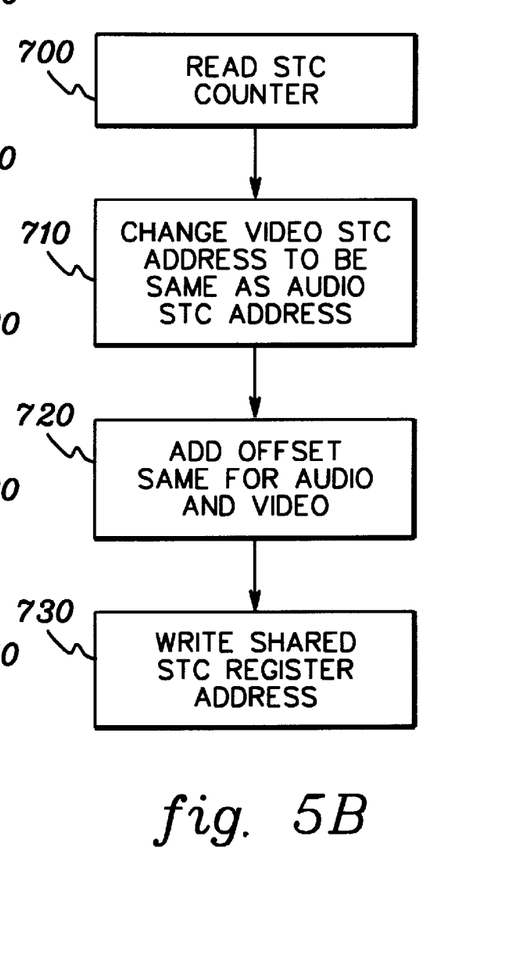

FIG. 5b depicts the scenario where the host controller simultaneously updates both the video STC register and the audio STC register. To accomplish this, at least one of the address register (ADDR_VID) associated with the video STC register and the address register (ADDR_AUD) associated with the audio STC register is written to so that a common value resides in each address register. More particularly, the host controller might read the STC counter 700 and (in this embodiment) change the video STC address to be the same as the audio STC address 710. Any desired offset is added to the STC value 720 and the resulting STC_NEW is commonly written to both the STC_VID register and the STC_AUD register in a single write access.

Those skilled in the art will note from the above discussion that a technique is provided herein for allowing a controller to selectively update multiple system time clocks (for example, located in the audio and video decoders of an MPEG decode system) in separate writes of different values or a common write of an identical value. When the STC value is shared, the technique guarantees that each clock has the same value, and when STC values are separately updated different offsets can be provided. Selectivity is achieved by setting up the STC addresses as updatable register fields. This principle can be extended to any group of registers that need to be independent under certain circumstances, and have a common value under other circumstances.

The present invention can be included, for example, in an article of manufacture (e.g., one or more computer program products) having, for instance, computer usable media. This media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for updating multiple registers comprising:
 providing a first address value to a first address register associated with a first counter register, and providing a second address value to a second address register associated with a second counter register; and
 performing one of independent updating or synchronous updating of a first count value in said first counter register and a second count value in said second counter register depending upon said first address value and said second address value provided to said first address register and said second address register, respectively.

2. The method of claim 1, wherein said providing comprises providing a common address to said first address register and to said second address register as said first address value and said second address value, respectively, and wherein said performing comprises performing synchronous updating of said first count value in said first counter register and said second count value in said second counter register with reference to said common address in said first address register and said second address register.

3. The method of claim 2, wherein said multiple registers are disposed within an MPEG system, and said performing synchronous updating comprises simultaneously performing a single write access to said first counter register and said second counter register to write a count update thereto.

4. The method of claim 1, wherein said providing comprises providing a different first address value and second address value to said first address register and said second address register, respectively, and wherein said performing comprises performing independent updating of said first count value in said first counter register and said second count value in said second counter register.

5. The method of claim 4, wherein said multiple registers are disposed within an MPEG system, and wherein said performing comprises employing multiple write accesses to independently update said first count value in said first counter register and said second count value in said second counter register, wherein different update counts are written to said first counter register and said second counter register during said multiple write accesses.

6. A method for updating multiple registers comprising:

(i) periodically writing separate updates to said multiple registers using multiple write accesses; and (ii) selectively simultaneously writing a common update to each of said multiple registers to synchronize values within said multiple registers, said selectively simultaneously writing using a single write access to said multiple registers.

7. The method of claim 6, wherein said multiple registers comprise multiple system clocks, and wherein said periodically writing (i) comprises writing a clock update with a different offset to each register of said multiple registers using said multiple write accesses.

8. A method for updating multiple registers comprising:

(i) separately writing updates to a first counter register having an associated first address register for addressing thereof, and a second counter register having an associated second address register for addressing thereof, so that said first counter register and said second counter register are updated independently;

(ii) writing to at least one of said first address register and said second address register so that said first address register and said second address register contain a common address; and (iii) simultaneously updating said first counter register and said second counter register with a common value when said first address register and said second address register contain said common address, said simultaneously updating synchronizing values within said first counter register and said second counter register.

9. The method of claim 8, wherein said first counter register contains a first system time clock (STC) value and said second counter register contains a second system time clock (STC) value, and wherein said separately writing (i) comprises addressing via said first address register and writing a first update to said first STC value, and addressing via said second address register and writing a second update to said second STC value.

10. The method of claim 8, further in combination with a decode system having a system time clock (STC) counter, and wherein said method further comprises periodically reading an STC count from said STC counter, and wherein said separately writing (i) comprises writing said STC count to said first counter register with a first offset and separately writing said STC count to said second counter register with a second offset.

11. The method of claim 10, wherein said decode system comprises a digital video decode system, and said first counter register comprises a video STC register and said second counter register comprises an audio STC register.

12. The method of claim 8, further comprising subsequent to said simultaneously updating (iii), writing an address value to at least one of said first address register and said second address register so that said first address register and said second address register contain different address values, and thereafter separately addressing said first counter register and said second counter register with reference to said different address values in said first address register and said second address register.

13. A multi-register system comprising:

a first counter register and an associated first address register having a first address value for use in addressing said first counter register;

a second counter register and an associated second address register having a second address value for use in addressing said second counter register; and a controller for performing separate updating or synchronous updating of a first count value in said first counter register and a second count value in said second counter register based upon said first address value in said first address register and said second address value in said second address register.

14. The system of claim 13, wherein said first address value and said second address value comprise a common address value, and said controller comprises means for simultaneously addressing said first counter register and said second counter register through said common address value in said first address register and said second address register for simultaneous updating of said first counter register and said second counter register.

15. The system of claim 14, wherein said multi-register system comprises an MPEG system, and wherein said first counter register comprises a first system time clock (STC) register and said second counter register comprises a second system time clock (STC) register.

16. The system of claim 15, wherein said MPEG system comprises a digital video decode system, and said first STC register comprises a video STC register and said second STC register comprises an audio STC register.

17. The system of claim 13, wherein said first address value and said second address value comprise different address values, and said controller comprises means for separately addressing said first counter register and said second counter register using said different address values in said first address register and said second address register, respectively, for separate updating of said first counter register and said second counter register.

18. The system of claim 13, wherein said controller further comprises means for writing an address value to at least one of said first address register and said second address register so that said first address value and said second address value comprise a common address value, and wherein said controller comprises means for simultaneously addressing said first counter register and said second counter register via said common address for synchronous updating of said first counter register and said second counter register.

19. The system of claim 13, wherein said controller further comprises means for writing an address value to at least one of said first address register and said second address register so that said first address value and said second address value comprise different address values, and wherein said controller comprises means for separately addressing said first counter register and said second counter register via said different address values in said first address register and said second address register, respectively, for separate updating of said first counter register and said second counter register.

20. A multi-clock system comprising:

a first counter register and associated first address register having a first updatable address value for use in addressing said first counter register;

a second counter register and associated second address register having a second updatable address value for use in addressing said second counter register; and a controller for:

(i) separately writing updates to said first counter register and said second counter register when said first updatable address value in said first address register is different from said second updatable address value in said second address register; and (ii) synchronously writing an update to said first counter register and said second counter register when said first updatable address value in said first address register is identical to said second updatable address value in said second address register.

21. The system of claim 20, wherein said controller comprises means for updating at least one of said first updatable address value in said first address register and said second updatable address value in said second address register to selectively make said first updatable address value different from or identical to said second updatable address value, thereby allowing said separately writing of updates (i) to said first counter register and said second counter register and said synchronous writing of updates (ii) to said first counter register and said second counter register, respectively.

22. The multi-clock system of claim 20, wherein said system comprises an MPEG decode system, and said first counter register comprises a first system time clock (STC) register and said second counter register comprises a second system time clock (STC) register, said first STC register comprising a video decode STC register and said second STC register comprising an audio decode STC register.

23. The system of claim 22, wherein said system further comprises a system time clock (STC) counter having an STC count, and wherein said controller further comprises means for periodically reading said STC count and updating said first counter register and said second counter register based thereon.

24. The system of claim 20, wherein said separately writing updates (i) comprises providing an update with a first offset to said first counter register and providing said update with a second offset to said second counter register, and wherein said separately writing updates comprises writing said update with said first offset to said first counter register in one write access, and writing said update with said second offset to said second counter register in another write access.

25. The system of claim 20, wherein said simultaneous writing updates (ii) further comprises providing a common offset to an update count and writing in a single write access said update count with said common offset to both said first counter register and said second counter register.

26. A computer program product comprising a computer usable medium having computer readable program code means therein for use in updating multiple registers, said computer readable program code means in said computer program product comprising:

computer readable program code means for causing a computer to affect providing a first address value to a first address register associated with a first counter register, and providing a second address value to a second address register associated with a second counter register; and computer readable program code means for causing a computer to affect performing one of independent updating or synchronous updating of a count value in said first counter register and a count value in said second counter register depending upon said first address value and said second address value provided to said first address register and said second address register, respectively.

27. A computer program product comprising a computer usable medium having computer readable program code means therein for use in updating multiple registers, said computer readable program code means in said computer program product comprising:

computer readable program code means for causing a computer to affect periodically writing separate updates to said multiple registers using multiple write accesses; and computer readable program code means for causing a computer to affect selectively simultaneously writing a common update to each of said multiple registers to synchronize values within said multiple registers, said selectively simultaneously writing using a single write access to said multiple registers.

* * * * *